(12) United States Patent
Volcker (10) Patent No.: US 9,232,072 B2
(45) Date of Patent: Jan. 5, 2016

(54) PARTICIPANT CONTROLLED SPATIAL AEC (71) Applicant: Bjorn Volcker, Mountain View, CA (US)

(72) Inventor: Bjorn Volcker, Mountain View, CA (US)

(73) Assignee: GOOGLE Inc., Mountain View, CA (US)

( * ) Notice: Subject to any disclaimer, the term of this patent is extended or adjusted under 35 U.S.C. 154(b) by 0 days.

(21) Appl. No.: 13/801,636

(22) Filed: Mar. 13, 2013

(65) Prior Publication Data
US 2015/0201087 A1 Jul. 16, 2015

(51) Int. Cl.
*H04M 9/08* (2006.01)
*H04N 7/14* (2006.01)
*G10L 21/00* (2013.01)

(52) U.S. Cl.
CPC .................... *H04M 9/082* (2013.01)

(58) Field of Classification Search
CPC ....... H04M 3/567; H04M 3/56; H04M 3/568; H04M 11/06; H04M 2203/5036; H04M 2250/52; H04M 9/082; H04M 2250/62; H04M 2201/50; H04M 3/562; H04M 3/564; H04M 3/42068; H04Q 2213/1324; G10L 17/00; G10L 19/005; G10L 19/008; G10L 2021/02082; G10L 21/003; G10L 21/02
USPC ............. 379/202.01, 203.01, 204.01, 205.01, 379/206.01, 406; 370/260, 261, 262; 455/416; 348/14.08; 704/270
See application file for complete search history.

(56) References Cited

U.S. PATENT DOCUMENTS

| 5,396,554 | A | 3/1995 | Hirano et al. |
| 5,737,431 | A | 4/1998 | Brandstein et al. |
| 6,408,327 | B1* | 6/2002 | McClennon et al. ......... 709/204 |
| 6,449,593 | B1 | 9/2002 | Valve |
| 6,493,448 | B1 | 12/2002 | Mann et al. |
| 6,496,584 | B2 | 12/2002 | Irwan et al. |
| 6,895,093 | B1 | 5/2005 | Ali |
| 6,990,193 | B2 | 1/2006 | Beaucoup et al. |
| 7,039,182 | B1 | 5/2006 | Leonidov et al. |
| 7,283,788 | B1* | 10/2007 | Posa et al. .................... 455/41.2 |
| 7,315,619 | B2* | 1/2008 | Marton et al. ........... 379/406.11 |
| 7,724,891 | B2 | 5/2010 | Beaucoup et al. |
| 7,822,213 | B2 | 10/2010 | Choi et al. |
| 7,826,609 | B1 | 11/2010 | Kim |
| 7,893,803 | B2* | 2/2011 | Fullerton et al. .............. 335/285 |
| 8,085,947 | B2 | 12/2011 | Haulick et al. |
| 8,112,275 | B2 | 2/2012 | Kennewick et al. |
| 8,130,941 | B2 | 3/2012 | Taniguchi et al. |
| 8,284,949 | B2 | 10/2012 | Farhang et al. |
| 2002/0015500 | A1 | 2/2002 | Belt et al. |
| 2002/0131583 | A1 | 9/2002 | Lu |
| 2003/0016632 | A1* | 1/2003 | Refai et al. .................... 370/260 |
| 2006/0002547 | A1* | 1/2006 | Stokes et al. ............. 379/406.14 |
| 2006/0133619 | A1* | 6/2006 | Curry et al. .................... 381/26 |

(Continued)

*Primary Examiner* — Ahmad F Matar
*Assistant Examiner* — Kharye Pope
(74) *Attorney, Agent, or Firm* — Birch, Stewart, Kolasch & Birch, LLP (57) ABSTRACT

Methods and systems are provided for speaker separated spatial acoustic echo cancellation (AEC). A new approach is provided to combat the non-identifiability issue in multiple loudspeaker arrangements with shared echo cancellation processing. By associating echo channels with actual speakers (e.g., participants, talkers, users, individuals, etc.) rather than loudspeakers, the methods and techniques provided allow for continued use of mono AEC. Also provided is a straightforward speaker detection scheme for identifying different speakers in a stereo loudspeaker environment.

24 Claims, 4 Drawing Sheets

(56) References Cited

U.S. PATENT DOCUMENTS

| | | |
|---|---|---|
| 2006/0182268 A1 | 8/2006 | Marton |
| 2007/0025538 A1* | 2/2007 | Jarske et al. ............. 379/202.01 |
| 2007/0133437 A1* | 6/2007 | Wengrovitz et al. .......... 370/260 |
| 2008/0159507 A1* | 7/2008 | Virolainen et al. ...... 379/202.01 |
| 2008/0285771 A1 | 11/2008 | Tanaka et al. |
| 2008/0298610 A1* | 12/2008 | Virolainen et al. ........... 381/307 |
| 2009/0086949 A1* | 4/2009 | Caspi et al. ............. 379/202.01 |
| 2009/0207763 A1* | 8/2009 | Li et al. ........................ 370/287 |
| 2009/0268008 A1* | 10/2009 | Topits ........................ 348/14.09 |
| 2010/0131278 A1* | 5/2010 | Chu ............................... 704/270 |
| 2011/0316967 A1* | 12/2011 | Etter ........................... 348/14.16 |
| 2013/0083911 A1* | 4/2013 | Bathurst et al. .......... 379/202.01 |
| 2013/0148801 A1* | 6/2013 | Li et al. .................... 379/406.06 |
| 2013/0162752 A1* | 6/2013 | Herz et al. ................. 348/14.08 |
| 2013/0300648 A1* | 11/2013 | Kim et al. ...................... 345/156 |
| 2014/0205116 A1* | 7/2014 | Smith et al. ................... 381/122 |

\* cited by examiner

PARTICIPANT CONTROLLED SPATIAL AEC

TECHNICAL FIELD

The present disclosure generally relates to methods, systems, and apparatus for cancelling or suppressing echoes in telecommunications systems. More specifically, aspects of the present disclosure relate to multiple-input multiple-output echo cancellation using an adjustable parameter to control cancellation filter.

BACKGROUND

As a consequence of today's laptop computers, conference rooms, etc., often being equipped with multiple microphones or other similar audio input devices, stereo codecs will also more frequently be used. This expected increase in stereo codecs emphasizes the need for MIMO (multiple-input multiple-output) audio processing and, in particular, MIMO echo cancellation. However, there are certain fundamental difficulties inherent in a stereo setup, or in any arrangement involving more than one loudspeaker, that must be addressed.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

One embodiment of the present disclosure relates to a method for echo cancellation comprising: determining an active participant in an audio conference, wherein the active participant is one of a plurality of participants in the audio conference; obtaining a corresponding channel for the active participant; converting at least one audio signal of the active participant into a mono signal; and performing echo cancellation on the mono signal based on the corresponding channel for the active participant.

In another embodiment, the method for echo cancellation further comprises determining that no corresponding channel exists for the active participant, and assigning a channel to the active participant.

In another embodiment, the method for echo cancellation further comprises receiving, at the near-end of the communication path, participant information for the active participant, and identifying the active participant based on the received participant information.

In yet another embodiment, the method for echo cancellation further comprises identifying the active participant at a far-end of the communication path, and receiving the identity of the active participant at the near-end of the communication path from the far-end.

In still another embodiment, the method for echo cancellation further comprises identifying the active participant using a plurality of signals at one end of a communication path.

In another embodiment, the method for echo cancellation further comprises obtaining pitch information for the plurality of signals, and identifying the active participant based on the pitch information for the plurality of signals.

In yet another embodiment, the method for echo cancellation further comprises deriving spatial information from the plurality of signals, and identifying the active participant based on the spatial information.

In still another embodiment, the method for echo cancellation further comprises estimating direction of arrival of the plurality of signals, and identifying the active participant based on the estimated direction of arrival of the plurality of signals.

In another embodiment, the method for echo cancellation further comprises estimating time delay of the plurality of signals, and identifying the active participant based on the estimated time delay of the plurality of signals.

In another embodiment, the method for echo cancellation further comprises estimating a palming parameter for the plurality of signals, and identifying the active participant based on the estimated palming parameter of the plurality of signals.

In another embodiment, the method for echo cancellation further comprises storing, in a channel database, the channel assigned to the active participant.

In still another embodiment of the method for echo cancellation, the step of converting the at least one audio signal into a mono signal includes selecting one of a plurality of loudspeaker signals rendered at a near-end of a communication path.

In yet another embodiment of the method for echo cancellation, the step of converting the at least one audio signal into a mono signal includes determining an average of a plurality of loudspeaker signals rendered at a near-end of a communication path, and using the average of the plurality of loudspeaker signals as the mono signal.

Another embodiment of the present disclosure relates to a method for echo cancellation comprising: determining whether a participant in an audio conference has been identified; responsive to determining that the participant has been identified, obtaining a corresponding channel for the participant; responsive to determining that the participant has not been identified, indexing the participant and assigning a channel to the participant; selecting a received audio signal as a mono signal; and performing echo cancellation on the mono signal based on the corresponding channel for the participant or the channel assigned to the participant.

In one or more other embodiments, the methods described herein may optionally include one or more of the following additional features: the step of determining the active participant is performed at a near-end of a communication path; the at least one audio signal of the active participant is received at the near-end of the communication path; the received participant information is generated at a far-end of the communication path; the plurality of signals is a plurality of loudspeaker signals, and the one end of the communication path is a near-end of the communication path; the plurality of signals is a plurality of microphone signals, and the one end of the communication path is a far-end of the communication path; the direction of arrival of the plurality of signals is estimated using a linear array structure; the panning parameter is estimated from a set of stereo audio signal data; the corresponding channel for the active participant is obtained from a channel database; the loudspeaker signal is selected from the plurality of loudspeaker signals based on highest signal power; the one of the plurality of loudspeaker signals rendered at the near-end of the communication path is selected as the mono signal based on beam-forming; and/or selecting the received audio signal as a mono signal includes converting the received audio signal to a mono signal.

Further scope of applicability of the present disclosure will become apparent from the Detailed Description given below. However, it should be understood that the Detailed Description and specific examples, while indicating preferred embodiments, are given by way of illustration only, since various changes and modifications within the spirit and scope of the disclosure will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

The headings provided herein are for convenience only and do not necessarily affect the scope or meaning of the claims.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples and embodiments will now be described. The following description provides specific details for a thorough understanding and enabling description of these examples and embodiments. One skilled in the relevant art will understand, however, that the various embodiments described herein may be practiced without many of these details. Likewise, one skilled in the relevant art will also understand that the various embodiments described herein can include many other obvious features not described in detail herein. Additionally, some well-known structures or functions may not be shown or described in detail below, so as to avoid unnecessarily obscuring the relevant description.

Embodiments of the present disclosure relate to methods and systems for spatial acoustic echo cancellation (AEC). In particular, the present disclosure describes in detail a new approach to combat the non-identifiability issue in multiple loudspeaker arrangements with shared echo cancellation processing. By associating echo channels with actual speakers (e.g., participants, talkers, users, individuals, etc.) rather than loudspeakers, the methods and techniques described herein allow for continued use of mono AEC. Furthermore, as will be described in greater detail below, the present disclosure provides a straightforward speaker detection scheme for identifying different speakers in a stereo loudspeaker arrangement.

As an example scenario, consider a two-part communication between person "X" and person "Y", where audio is transmitted from one person to the other. Assume person X is currently talking. The speech from person X is transmitted to the location of person Y and played out through loudspeakers so that person Y can hear what person X is saying. Simultaneously, the audio at the location of person Y is captured by microphones at that location. This captured audio also includes the speech from person X that is being played out through the loudspeakers. If no special processing is performed on the audio signals captured (e.g., via the microphones) at the location of person Y, the audio transmitted back to person X will include person X's own voice. This is called an echo. Echo cancellation is signal processing performed at the client located at person Y to eliminate/suppress the speech from person X, using the signals from the microphones and loudspeakers.

Continuing with the above example, consider the client located at person Y, where it is desirable to cancel the echo. Echo cancellation in this scenario is accomplished using the signals from the loudspeaker(s) and microphone(s) at the location of person Y. One step in an example process of echo cancellation is estimating the channel from a loudspeaker to a microphone. Since each microphone involved in echo cancellation may be treated separately, for purposes of the present explanation it is general enough to consider one microphone only, and focus instead on the number of loudspeakers. For example, consider the case of two loudspeakers and one microphone, as illustrated in the example arrangement of FIG. 1.

Figure 1:
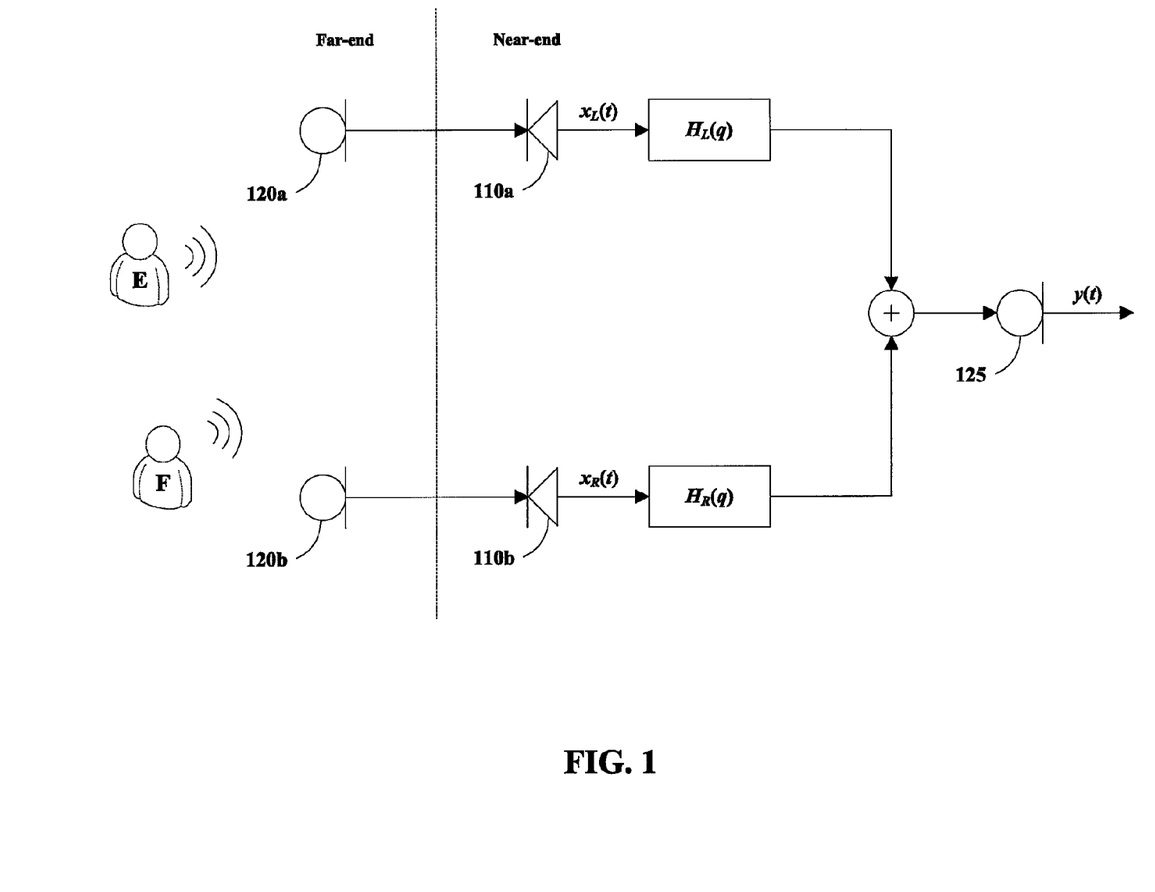
FIG. 1 is a block diagram illustrating an example arrangement of an existing acoustic echo canceller.

Referring to FIG. 1, illustrated is an example stereo audio environment including far-end audio capture devices (e.g., microphones) 120a and 120b, near-end audio render devices (e.g., loudspeakers) 110a and 110b, and near-end audio capture device (e.g., microphone) 125. Microphones 120a and 120b may capture audio signals at the far-end of the audio transmission path from users "E" and "F" and transmit the audio signals to near-end loudspeakers 110a and 110b, where the audio signals are played out. It should be noted that audio from both users E and F may be captured and transmitted by either and both of the far-end microphones 120a and 120b.

Render devices 110a and 110b may be any of a variety of audio output devices, including a loudspeaker or group of loudspeakers configured to output sound from one or more channels. Far-end capture devices 120a and 120b, and near-end capture device 125 may be any of a variety of audio input devices, such as one or more microphones configured to capture sound and generate input signals. For example, render devices 110a and/or 110b and capture device 125, may be hardware devices internal to a computer system, or external peripheral devices connected to a computer system via wired and/or wireless connections. In some arrangements, render devices 110a and/or 110b, and capture device 125 may be components of a single device, such as a microphone, telephone handset, etc. Additionally, one or more of render devices 110a and 110b, and capture devices 120a, 120b, and 125 may include analog-to-digital and/or digital-to-analog transformation functionalities.

In the following example, the signals from loudspeakers 110a and 110b can be respectively denoted as $x_L(t)$ and $x_R(t)$, and the signal from microphone 125 denoted as y(t). Further, let the channel from loudspeaker 110a be $H_L(q)$ and the channel from loudspeaker 110b be $H_R(q)$. The signal from microphone 125, y(t), can then be expressed as a function of the loudspeakers as follows:

$$y(t) = H_L(q)x_L(t) + H_R(q)x_R(t) \tag{1}$$

The above expression in equation (1) can be taken one step further by incorporating the actual source, $s_E(t)$, (e.g. speaker E in FIG. 1) as follows:

$$x_L(t) = G_{LE}(q)s_E(t) \tag{2}$$

$$x_R(t) = G_{RE}(q)s_E(t) = G_{RE}(q)G_{LE}^{-1}(q)x_L(t) \tag{3}$$

where $G_{LE}(q)$ is the channel from speaker E to the far-end microphone 120a and $G_{RE}(q)$ is the channel from speaker E to the far-end microphone 120b. As shown in equation (3), one microphone signal (e.g., signal $x_R(t)$) may now be written as a function of the other. Accordingly, there is a high correlation between the signals.

The near-end microphone signal (e.g., the signal from microphone 125) can be expressed as the following:

$$y(t)=(H_L(q)G_{LE}(q)+H_R(q)G_{RE}(q))s_E(t)=G(q)s(t)=G(q)G_{LE}^{-1}(q)x_L(t) \quad (4)$$

It is now understood that the system illustrated in FIG. 1 is actually a mono system.

One step in the process of echo cancellation is estimating the channels $H_L(q)$ and $H_R(q)$ (e.g., from loudspeakers 110a and 110b, respectively, to microphone 125, as shown in FIG. 1) using measurements of y(t) and $x_L(t)$, $x_R(t)$. It should be noted from equations (1) and (4) that the same system as described above may be written from $x_L(t)$, $x_R(t)$ to y(t) in two alternative ways, and that the above manner is merely an example of one of the ways. However, this illustrates that there is no unique solution, which is known as a "non-identifiable system."

When a mono AEC system, such as that illustrated in FIG. 1, is extended to an environment involving multiple loudspeakers, noise and other disturbances can create uncertainties in the channel estimates. In practice, it does not matter that the channel estimate in such a situation is likely to be incorrect since one representation is generally good enough. However, it is possible for the estimation process to end up in a sub-optimal solution and the echo cancellation would likely be improved by converging to the true/optimal solution.

Furthermore, one result of extending the mono AEC system with parameters for an additional channel is that the system becomes over-parameterized. The extra parameters present in the extended mono AEC system may be used to suppress the speech from a user located at the near-end, thereby degrading overall performance. Also, increasing the number of parameters in the mono AEC system increases convergence time as a result.

As was illustrated above with respect to equation (4), when there is only one true source of speech, the system is actually a mono system and the extension of the system to stereo is a degradation of the signal. Accordingly, it is important to know when to convert from stereo to mono in the context of echo cancellation processing.

One approach used to combat the correlation between loudspeakers (e.g., loudspeakers 110a and 110b as shown in the example arrangement of FIG. 1), and hence the non-identifiability issue, is to pre-process the audio signals. Such pre-processing adds (hopefully) non-audible, non-linear effects to reduce the correlation between the loudspeakers. However, manipulating the loudspeaker signals in an attempt to de-correlate the signals adds computational complexity, can be audible as distortion, can remove the phase between the signals that gives the room/stereo effect, and can also degrade performance since the adaptation/estimation processes may try to find the coupling between the original signals.

It should be noted that converting from stereo to mono does not mean that the received signal should also be played out in mono. Rather, this is an internal conversion in the echo cancellation processing. Nevertheless, there are scenarios in which echo cancellation will likely perform better with a signal in stereo than with a signal in mono.

For example, consider a conference scenario with multiple participants. One way to achieve a distributed effect among the participants is to virtually place the participants at positions from left to right by panning. In an extreme case, one participant would be in the left loudspeaker and one participant in the right loudspeaker. Now assume that the stereo signal is converted into a mono signal and processed. There is then one system when the left speaker is active, and the channel estimation will converge towards that speaker. As soon as the right speaker becomes active, there is a new system towards which the channel estimation will converge. Accordingly, there is a need to readapt every time a toggle occurs between speakers, resulting in a loss in performance for echo cancellation purposes.

Continuing with the example presented above, if the echo cancellation could instead be performed on a stereo signal, there would only be a need to adapt $H_L(q)$ when the left speaker is active and adapt $H_R(q)$ when the right speaker is active. The reason for this is because the other loudspeaker is silent and no adaptation will be performed, thus preserving the adaptation instead of readapting.

Another example scenario in which echo cancellation will likely perform better with a signal in stereo than with a signal in mono is where the loudspeakers are widely separated. In such a scenario, the acoustic channel from one loudspeaker to the microphone may differ significantly between the loudspeakers. If the signal is then converted from stereo to mono, the result may be an echo channel impulse response longer than what can be captured with the adaptive filter, thus losing performance. Such a result could be avoided by staying with the stereo signal and allowing the loudspeaker signals to align separately.

An additional scenario where echo cancellation is likely to perform better with a signal in stereo than with a signal in mono is when there are multiple participants to a conference in the same room. For example, consider communication between user "X" and user "Y", where audio is transmitted from one user to the other and user X is actually a conference room (e.g., multiple participants speaking) with multiple microphones (e.g., two microphones for purposes of simplicity). The audio from user X is transmitted in stereo to user Y, who has two loudspeakers. Every time someone at user X speaks, there is a mono system as in equation (4) above, with a different G(q) for each speaker. Like in the conference mixing scenario described above, there will be a need to readapt each time there is a switch between speakers, which will result in degraded echo cancellation performance. If the signals are instead processed in stereo, then there will be improved performance in echo cancellation.

As described above, the microphone signal may be expressed as a function of the actual sources (e.g., s(t)) instead of a function of the loudspeaker signals. Further, the actual sources may be expressed as functions of the loudspeaker signals. As will be described herein, embodiments of the present disclosure provide a solution to the non-identifiability situation by implementing speaker separated echo cancellation. As used herein, "speaker separated" refers to associating one echo channel per speaker (e.g., individual, user, etc.) rather than one echo channel per loudspeaker (e.g., audio output device). In addition to resolving the non-identifiability issue, the speaker separated echo cancellation approach described herein also results in improved convergence.

Figure 2:
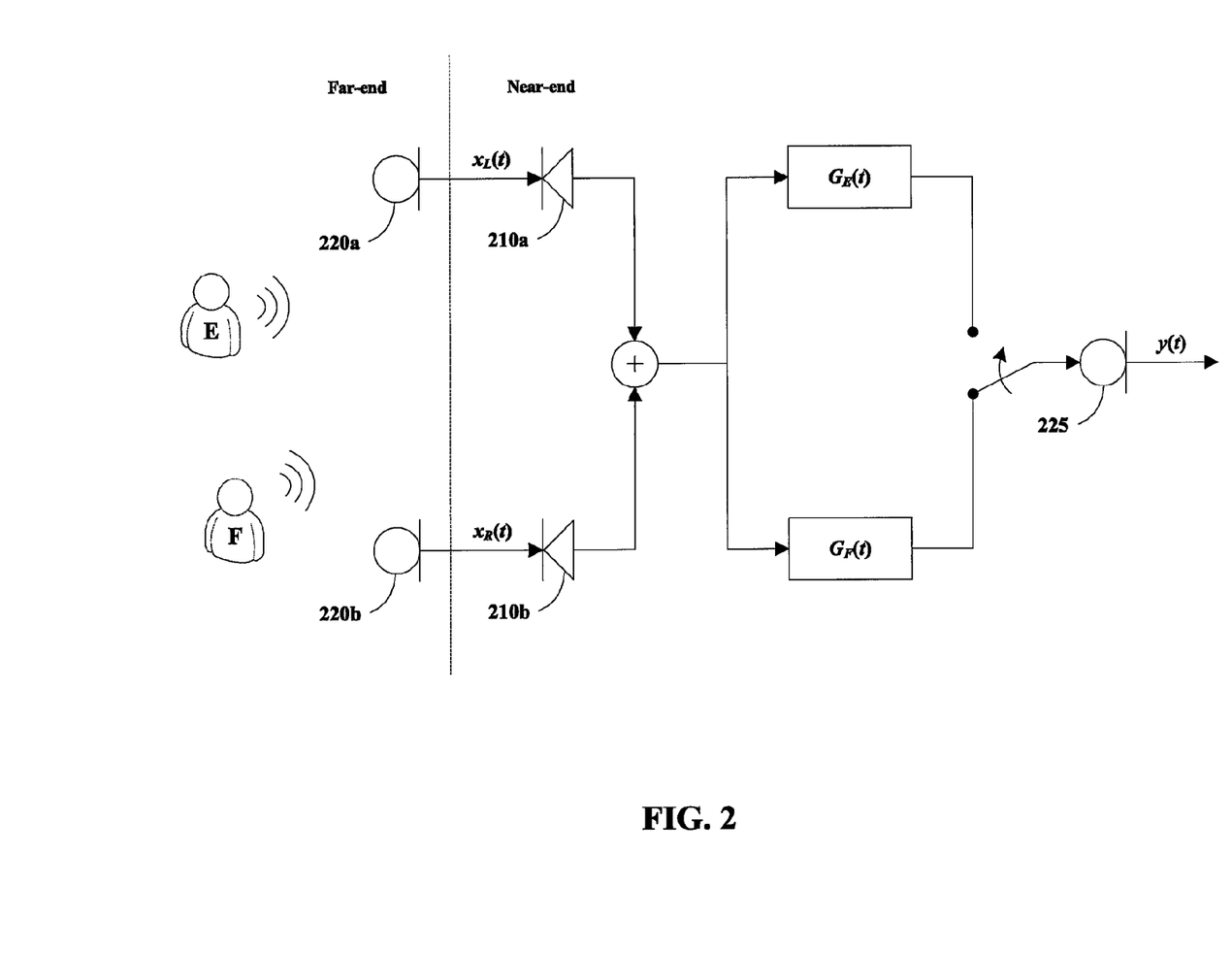
FIG. 2 is a block diagram illustrating an example model for speaker separated stereo acoustic echo cancellation according to one or more embodiments described herein.

FIG. 2 is a block diagram illustrating an example model of speaker separated stereo AEC according to one or more embodiments described herein. It should be noted that while FIG. 2 shows a "model" of speaker separated AEC, the actual system remains similar to that illustrated in FIG. 1, described above. The example shown in FIG. 2 includes far-end audio capture devices (e.g., microphones) 220a and 220b, near-end audio render devices (e.g., loudspeakers) 210a and 210b, and near-end audio capture device (e.g., microphone) 225. Microphones 220a and 220b may capture audio signals at the far-end of the audio transmission path from speakers "E" and "F" (e.g., participants, users, talkers, individuals, etc.) and transmit the audio signals to near-end loudspeakers 210a and 210b, where the audio may be played out (e.g., to one or more participants located at the near-end). It should again be noted that audio from both users E and F may be captured and transmitted by either or both of the far-end microphones 220a and 220b.

It should also be noted that one or more of the various components illustrated in FIG. 2 may be similar to corresponding components illustrated in FIG. 1. For example, one or both of far-end capture devices 220a and 220b, and/or near-end capture device 225 may include one or more similar features as capture devices 120a, 120b, and/or 125 described above with respect to FIG. 1. Additionally, one or both of near-end render devices 210a and 210b as shown in FIG. 2 may include one or more similar features as render devices 110a and 110b described above with respect to FIG. 1. Furthermore, any additional render and/or capture devices that may be used in the example arrangement shown in FIG. 2 may also have one or more features similar to render devices 110a and 110b, and/or capture devices 120a, 120b, and 125 as shown in FIG. 1.

In some scenarios, such as an audio conference in which audio from multiple participants is being mixed, it may be possible to determine which speaker is active by transmitting identifying information along with the signal. Implementing a source separation/classification algorithm is overly complex. Instead, a low-complexity alternative is to assume a panning structure and estimate the panning parameter to identify the speakers. However, if the participants are located too close to one another, the differences in echo channels are likely to be minimal and there may be little gain in performance.

Other approaches may also be used for determining the active speaker. For example, algorithms from antenna array signal processing may be used. In such an example, a linear array structure may be used to estimate the direction of arrival (DOA) from which the speech is coming (it should be noted that use of such a linear array structure may depend on all of the loudspeakers being located on a line). This may require knowledge of the relative distance. A more general setup (e.g., no linear constraint) may require 2-dimensional or 3-dimensional coordinates of each location.

Another alternative would be to estimate the time delay between the signals. With any of the approaches described above, the panning parameter, DOA, and/or time delay is associated with each of the speakers, and the current value may be used to determine which of the speakers is active. One can also look at the pitch to distinguish different speakers from each other and thereby control which speaker is active.

In at least one embodiment, it is assumed that there is a panning scenario between left and right loudspeakers, $x_L(t) = ws(t)$, $x_R(t) = (1-w)s(t)$. The panning parameter, $w$, can now be estimated from a set of stereo data. For example, a least squares problem may be formed from which the estimation of the panning parameter, $w$, results in finding the roots of a second order equation:

$$w^2 * (x_R - x_L)^T (x_R + x_L) - w * (x_L^T (x_R - x_L) + x_R^T (x_R + x_L)) + x_L^T x_R = 0 \quad (5)$$

In the above equation (5), the data is stacked into vectors for a more compact notation. The panning parameter estimate may then be chosen as the solution that satisfies $0 \leq w \leq 1$. If no such solution exists, then the closest boundary value may be selected as the estimate (e.g., if both solutions are negative, then set $w=0$).

Each speaker is associated with a panning parameter value ($w_E$ and $w_F$), and these values may be used to determine which speaker is active. For example, if the panning parameter is estimated as $w=0.6$, and $w_E=0.2$, $w_F=0.9$, then speaker "F" would be selected since 0.6 is closer to 0.9 than 0.2.

Figure 3:
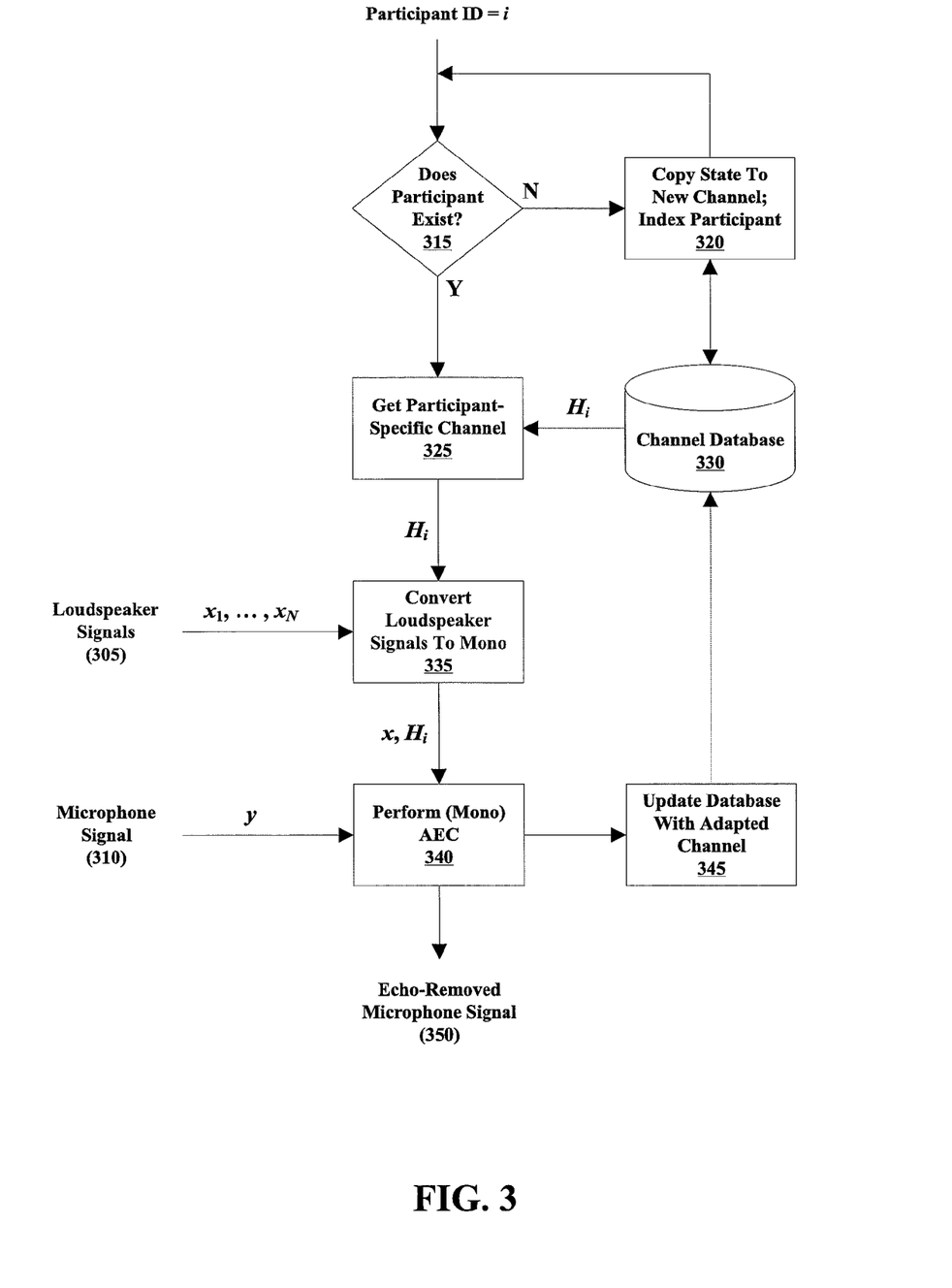
FIG. 3 is a flowchart illustrating an example method for speaker separated stereo acoustic echo cancellation according to one or more embodiments described herein.

FIG. 3 is a flowchart illustrating an example process for speaker separated stereo AEC according to one or more embodiments described herein. In at least the example embodiment shown, echo cancellation may begin in a mono setup where participants (e.g., the speakers) in a communication session (e.g., an audio conference) are indexed. For example, a speaker may be assigned a Participant ID, such as i (where "i" is an arbitrary number).

At block 315, a determination may be made as to whether the speaker is a new participant in the communication session or has already been indexed. If it is determined that the speaker is a new participant, then at block 320 the current state for that speaker may be copied to a new channel and the speaker may be indexed. In at least one embodiment, the copied state of the speaker and the index may be stored/updated in a channel database 330. From block 320 the process may return to block 315.

If it is determined at block 315 that the speaker has already been indexed, the process may continue to block 325 where the specific channel for the speaker (e.g., the participant-specific channel, $H_i$) may be identified. In at least one example, the participant-specific channel may be obtained (e.g., referenced, retrieved, etc.) from the channel database 330.

Given the participant-specific channel ($H_i$) identified at block 325, the loudspeaker signals 305 (e.g., signals generated from near-end audio render devices 210a and 210b, as shown in the example of FIG. 2) may be converted from stereo to mono at block 335. At block 340, the converted loudspeaker signals may be used to perform (mono) AEC on the microphone signal 305 (e.g., signal captured at near-end audio capture device 225, as shown in the example of FIG. 2) to generate an echo-removed signal 350 as output. At block 345, the channel database 330 may be updated with the adapted echo channel.

Figure 4:
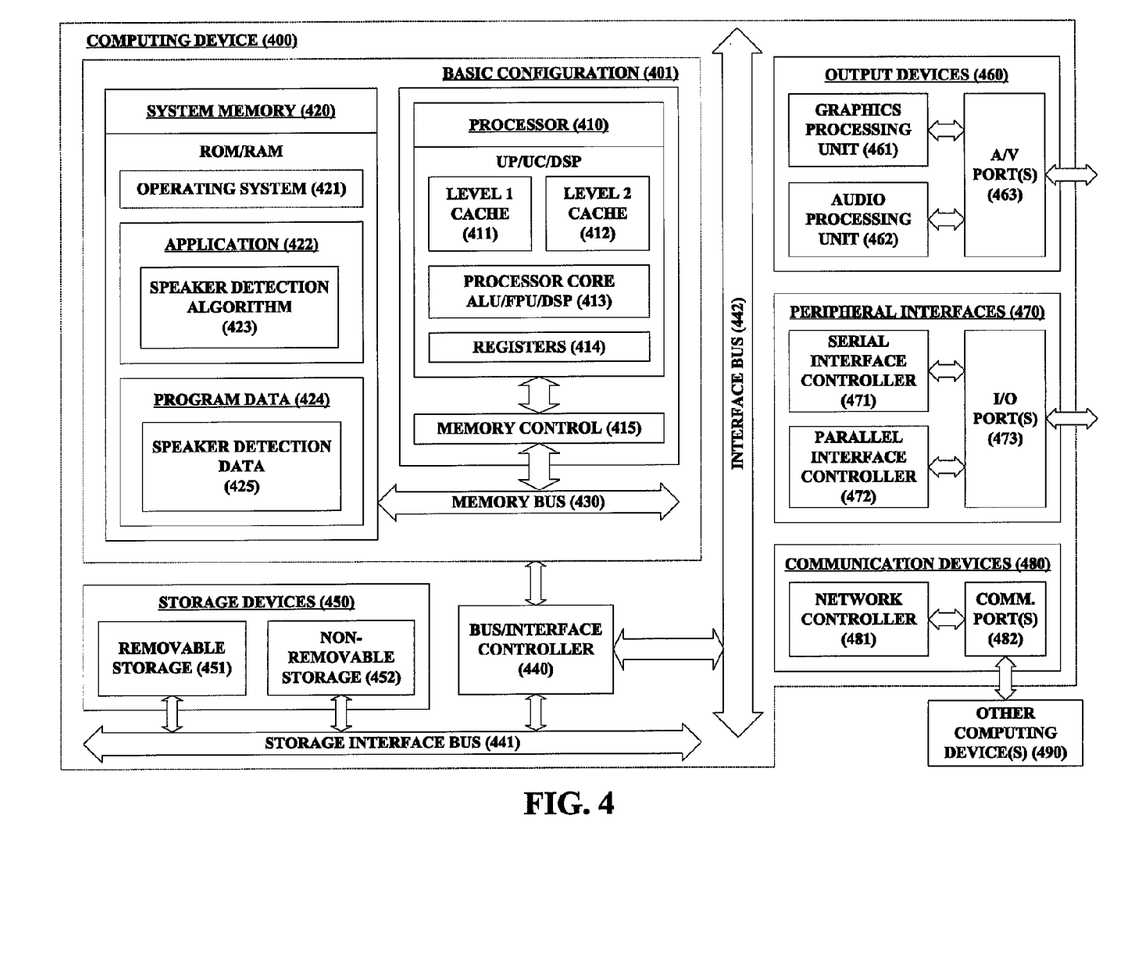
FIG. 4 is a block diagram illustrating an example computing device arranged for speaker separated stereo echo cancellation according to one or more embodiments described herein.

FIG. 4 is a block diagram illustrating an example computing device 400 that is arranged for speaker separated spatial acoustic echo cancellation in accordance with one or more embodiments of the present disclosure. In particular, the computing device 400 is configured to associate echo channels with actual speakers (e.g., participants, talkers, users, individuals, etc.) rather than loudspeakers, thereby allowing for continued use of mono AEC. Additionally, in accordance with at least one embodiment, the example computing device 400 is further arranged for implementing a speaker detection scheme whereby different speakers in a stereo loudspeaker environment can be identified. In a very basic configuration 401, computing device 400 typically includes one or more processors 410 and system memory 420. A memory bus 430 may be used for communicating between the processor 410 and the system memory 420.

Depending on the desired configuration, processor 410 can be of any type including but not limited to a microprocessor (μP), a microcontroller (μC), a digital signal processor (DSP), or any combination thereof. Processor 410 may include one or more levels of caching, such as a level one cache 411 and a level two cache 412, a processor core 413, and registers 414. The processor core 413 may include an arithmetic logic unit (ALU), a floating point unit (FPU), a digital signal processing core (DSP Core), or any combination thereof. A memory controller 415 can also be used with the processor 410, or in some embodiments the memory controller 415 can be an internal part of the processor 410.

Depending on the desired configuration, the system memory 420 can be of any type including but not limited to volatile memory (e.g., RAM), non-volatile memory (e.g., ROM, flash memory, etc.) or any combination thereof. System memory 420 typically includes an operating system 421, one or more applications 422, and program data 424. In at least some embodiments, application 422 includes a speaker detection algorithm 423 that is configured to identify different speakers (e.g., talkers, users, participants, etc.) in a stereo loudspeaker arrangement. The speaker detection algorithm may be configured to follow a panning structure and estimate a corresponding panning parameter to identify the speakers.

Program Data 424 may include speaker detection data 425 that is useful for identifying speakers and estimating a panning parameter. In some embodiments, application 422 can be arranged to operate with program data 424 on an operating system 421 such that the speaker detection algorithm 423 can estimate the panning parameter using a set of stereo data obtained from the speaker detection data 425. For example, the speaker detection algorithm 423 can utilize a least squares method when estimating the panning parameter from the speaker detection data 425.

Computing device 400 can have additional features and/or functionality, and additional interfaces to facilitate communications between the basic configuration 401 and any required devices and interfaces. For example, a bus/interface controller 440 can be used to facilitate communications between the basic configuration 401 and one or more data storage devices 450 via a storage interface bus 441. The data storage devices 450 can be removable storage devices 451, non-removable storage devices 452, or any combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), tape drives and the like. Example computer storage media can include volatile and nonvolatile, removable and non-removable media implemented in any method or technology for storage of information, such as computer readable instructions, data structures, program modules, and/or other data.

System memory 420, removable storage 451 and non-removable storage 452 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media can be part of computing device 400.

Computing device 400 can also include an interface bus 442 for facilitating communication from various interface devices (e.g., output interfaces, peripheral interfaces, communication interfaces, etc.) to the basic configuration 401 via the bus/interface controller 440. Example output devices 460 include a graphics processing unit 461 and an audio processing unit 462, either or both of which can be configured to communicate to various external devices such as a display or speakers via one or more A/V ports 463. Example peripheral interfaces 470 include a serial interface controller 471 or a parallel interface controller 472, which can be configured to communicate with external devices such as input devices (e.g., keyboard, mouse, pen, voice input device, touch input device, etc.) or other peripheral devices (e.g., printer, scanner, etc.) via one or more I/O ports 473.

An example communication device 480 includes a network controller 481, which can be arranged to facilitate communications with one or more other computing devices 490 over a network communication (not shown) via one or more communication ports 482. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 400 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost versus efficiency trade-offs. There are various vehicles by which processes and/or systems and/or other technologies described herein can be effected (e.g., hardware, software, and/or firmware), and the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation. In one or more other scenarios, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those skilled within the art that each function and/or operation within such block diagrams, flowcharts, or examples can be implemented, individually and/or collectively, by a wide range of hardware, software, firmware, or virtually any combination thereof.

In one or more embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments described herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof. Those skilled in the art will further recognize that designing the circuitry and/or writing the code for the software and/or firmware would be well within the skill of one of skilled in the art in light of the present disclosure.

Additionally, those skilled in the art will appreciate that the mechanisms of the subject matter described herein are capable of being distributed as a program product in a variety of forms, and that an illustrative embodiment of the subject matter described herein applies regardless of the particular type of signal-bearing medium used to actually carry out the distribution. Examples of a signal-bearing medium include, but are not limited to, the following: a recordable-type medium such as a floppy disk, a hard disk drive, a Compact Disc (CD), a Digital Video Disk (DVD), a digital tape, a computer memory, etc.; and a transmission-type medium such as a digital and/or an analog communication medium (e.g., a fiber optic cable, a waveguide, a wired communications link, a wireless communication link, etc.).

Those skilled in the art will also recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method for acoustic echo cancellation comprising:
   determining an active participant in an audio conference, wherein the active participant is one of a plurality of participants in the audio conference;
   identifying a corresponding echo channel specific to the active participant;
   converting at least one audio signal of the active participant received at a near-end of a communication path into a mono signal; and
   performing echo cancellation on the converted mono signal based on the corresponding echo channel specific to the active participant,
   wherein converting the at least one audio signal of the active participant into the mono signal includes selecting one of a plurality of loudspeaker signals rendered at the near-end of the communication path as the mono signal based on beam-forming.

2. The method of claim 1, wherein the determining the active participant is performed at the near-end of the communication path.

3. The method of claim 1, further comprising receiving the at least one audio signal of the active participant at the near-end of the communication path.

4. The method of claim 1, further comprising:
   responsive to determining the active participant in the audio conference, determining that no corresponding echo channel exists for the active participant; and
   assigning an echo channel to the active participant, wherein the assigned echo channel is specific to the active participant.

5. The method of claim 2, further comprising:
   receiving, at the near-end of the communication path, participant information for the active participant; and
   identifying the active participant based on the received participant information.

6. The method of claim 5, wherein the received participant information is generated at a far-end of the communication path.

7. The method of claim 2, further comprising:
   identifying the active participant at a far-end of the communication path; and
   receiving the identity of the active participant at the near-end of the communication path from the far-end.

8. The method of claim 1, further comprising identifying the active participant using a plurality of signals at one end of the communication path.

9. The method of claim 8, wherein the plurality of signals is a plurality of loudspeaker signals, and wherein the one end of the communication path is a near-end of the communication path.

10. The method of claim 8, wherein the plurality of signals is a plurality of microphone signals, and wherein the one end of the communication path is a far-end of the communication path.

11. The method of claim 8, further comprising:
    obtaining pitch information for the plurality of signals; and
    identifying the active participant based on the pitch information for the plurality of signals.

12. The method of claim 8, further comprising:
    deriving spatial information from the plurality of signals; and
    identifying the active participant based on the spatial information.

13. The method of claim 8, further comprising:
    estimating direction of arrival of the plurality of signals; and
    identifying the active participant based on the estimated direction of arrival of the plurality of signals.

14. The method of claim 13, wherein the direction of arrival of the plurality of signals is estimated using a linear array structure.

15. The method of claim 8, further comprising:
    estimating time delay of the plurality of signals; and identifying the active participant based on the estimated time delay of the plurality of signals.

16. The method of claim 8, further comprising:
estimating a panning parameter for the plurality of signals; and
identifying the active participant based on the estimated panning parameter of the plurality of signals.

17. The method of claim 16, wherein the panning parameter is estimated from a set of stereo audio signal data.

18. The method of claim 1, wherein the corresponding echo channel for the active participant is obtained from a channel database.

19. The method of claim 4, further comprising storing, in a channel database, the echo channel assigned to the active participant.

20. The method of claim 1, wherein the loudspeaker signal is selected from the plurality of loudspeaker signals based on highest signal power.

21. The method of claim 1, wherein converting the at least one audio signal into a mono signal includes:
determining an average of a plurality of loudspeaker signals rendered at the near-end of the communication path; and
using the average of the plurality of loudspeaker signals as the mono signal.

22. A method for acoustic echo cancellation comprising:
determining whether a participant in an audio conference has been identified;
responsive to determining that the participant has been identified, obtaining a corresponding echo channel specific to the participant;
responsive to determining that the participant has not been identified, indexing the participant and assigning an echo channel to the participant, wherein the assigned echo channel is specific to the participant;
selecting one of a plurality of audio signals rendered at a near-end of a communication path as a mono signal based on beam-forming; and
performing echo cancellation on the mono signal based on the corresponding echo channel specific to the participant or the assigned echo channel specific to the participant.

23. The method of claim 22, wherein selecting one of the plurality of audio signals as the mono signal includes converting the one of the plurality of audio signals to a mono signal.

24. A method for acoustic echo cancellation comprising:
determining an active participant in an audio conference, wherein the active participant is one of a plurality of participants in the audio conference, and wherein the active participant is determined based on a panning parameter estimated from a set of stereo audio signal data at one end of a communication path;
identifying a corresponding echo channel specific to the active participant;
converting at least one audio signal of the active participant received at a near-end of the communication path into a mono signal; and
performing echo cancellation on the converted mono signal based on the corresponding echo channel specific to the active participant.

* * * * *